United States Patent [19]

Shacket

[11] 4,364,196

[45] Dec. 21, 1982

[54] METHOD OF OPERATING FERROUS TOY

[76] Inventor: Sheldon R. Shacket, 1446 W. Hutchinson St., Chicago, Ill. 60611

[21] Appl. No.: 214,274

[22] Filed: Dec. 8, 1980

[51] Int. Cl.³ .................... A63H 33/26; G09B 23/18
[52] U.S. Cl. .................... 46/242; 273/1 M; 434/301
[58] Field of Search .................... 46/236, 241, 242; 434/301; 273/1 M

[56]  References Cited

U.S. PATENT DOCUMENTS

| 1,535,035 | 4/1925 | Philipp | 46/236 X |
| 3,077,696 | 2/1963 | Barnett et al. | 46/241 X |
| 3,906,658 | 9/1975 | Gross | 46/236 X |

FOREIGN PATENT DOCUMENTS 726429  3/1932  France .................... 46/236

OTHER PUBLICATIONS

Wood et al., "The Boy's Own Treasury of Sports & Pastimes", Publ., by Geo. Routledge & Sons, London, pp. 600-601.

Primary Examiner—F. Barry Shay
Attorney, Agent, or Firm—Merriam, Marshall & Bicknell

[57]  ABSTRACT

The present invention relates to a magnetic toy, and more specifically to a unique procedure which enables an operator to accomplish a series of unusual effects or formations, based on the phenomenon of residual magnetism. The method of the invention is made possible by manipulating a permanent magnet, a series of non-magnetic ferrous balls and a non-magnetic ferrous stick or rod.

3 Claims, 17 Drawing Figures

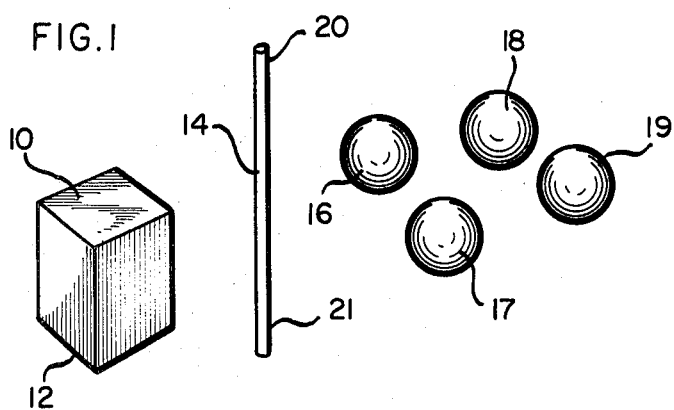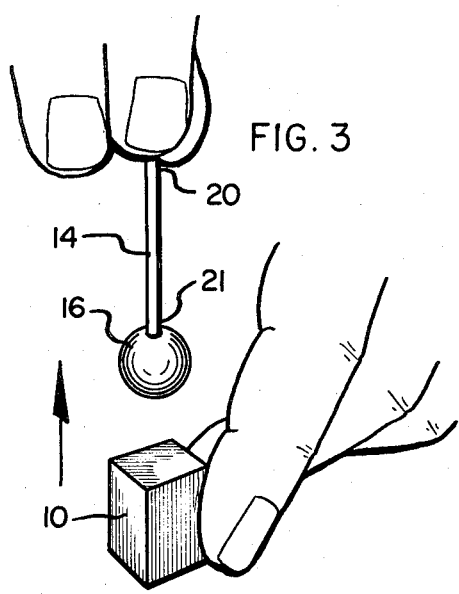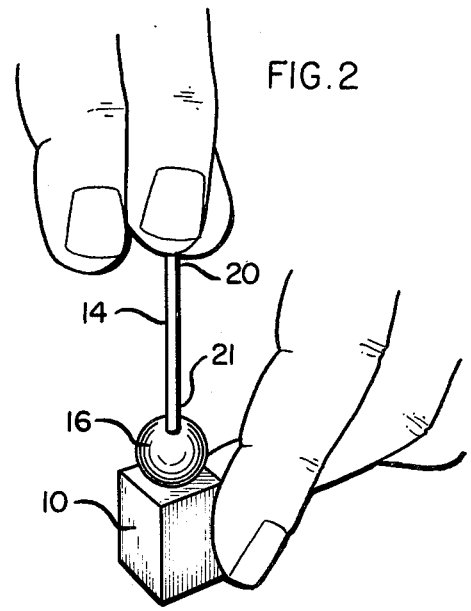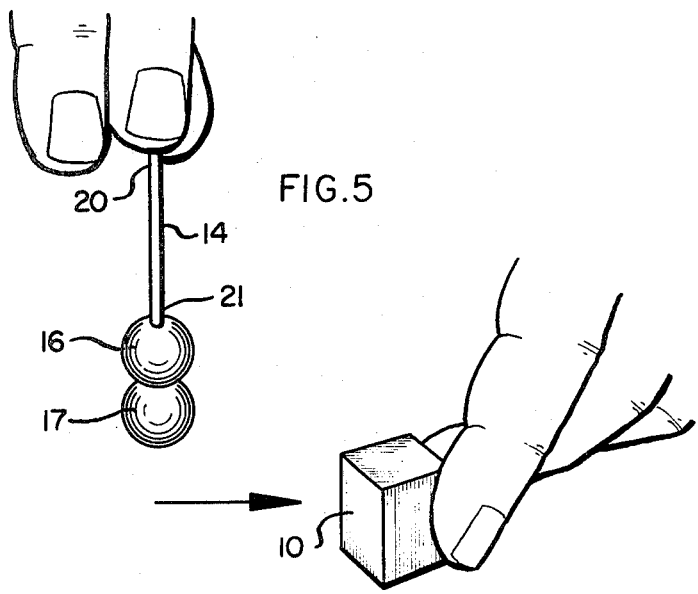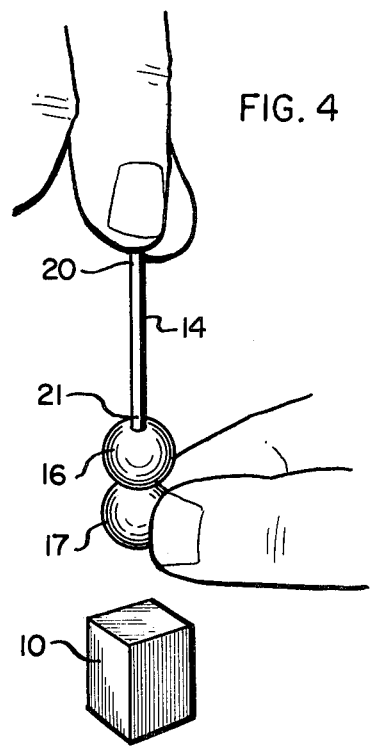

METHOD OF OPERATING FERROUS TOY

SUMMARY OF THE INVENTION

The method of the present invention requires enacting a prescribed procedure of manipulating the permanent magnet, non-magnetic ferrous stick or rod and non-magnetic ferrous balls. It has been found that while the "effects" are possible utilizing a variety of materials, relationship of size, mass and magnetic strength is fairly critical. Thus some relationship should be maintained in the types and sizes of materials utilized or the "effects" to be enumerated may not be possible to achieve.

Apparatus which has proved to be particularly useful in practicing the method of the invention comprises: A 0.495"×0.635"×0.355" permanent magnet designated Alnico #6; a non-magnetic ferrous stick or rod 2.225" long×0.0795" in diameter with a 45 degree chamfer on each end, which is made of a B1113 or 1213 screw machine stock; and a series of 7/16" diameter chrome steel balls. If any of the above elements is altered, the resultant effects may be lessened. Thus, for example, the use of a smaller or weaker magnet may result in the reduction in the number of balls or some reduction in the size of balls used to perform various effects with the device. On the other hand, the use of a more powerful magnet should permit some increase in the size of the balls employed. Thus, the device may be manufactured in any convenient size and employ any type of magnet, any size non-magnetic ferrous balls, and any size non-magnetic sticks.

A feature of the invention is the ability of the non-magnetic ferrous stick or rod to attract the non-magnetic ferrous balls away from the magnet and to hold said balls for a prolonged period of time without the aid or proximity of the magnet. Another feature of the invention is the ability of the elements of the "device" to form a series of specific formations (to be described later), when following an exact method or procedure.

These together with other objects, features and advantages, which will become subsequently apparent, reside in the details of construction and operation as more fully hereinafter described and claimed, reference being made to the accompanying drawings forming a part hereof, wherein like numerals refer to like parts throughout, and in which:

BRIEF DESCRIPTION OF THE DRAWINGS

FIG. 1 is a perspective view of the toy elements employed in the method of the present invention.

FIGS. 2, 3, 4, 5 and 6 are perspective views showing a manipulating procedure according to the method of the present invention.

DETAILED DESCRIPTION OF EMBODIMENTS OF THE INVENTION

Figure 6:
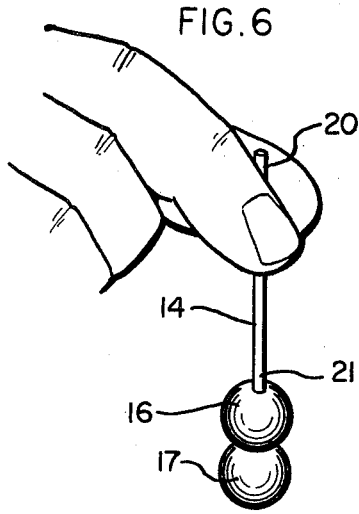

Referring now to FIG. 1, the method of the present invention utilizes a permanent magnet 10, a non-magnetic ferrous rod or stick 14, which is machined to a 45 degree chamfer on each end of rod bottom portion 21 and rod top portion 20, and a series of non-magnetic ferrous balls 16, 17, 18 and 19. The magnet is magnetized vertically so that the North and South Poles are positioned through axis 10, 12.

FIGS. 2 through 6 indicate one method or sequence of manipulations to accomplish the effect depicted in FIG. 6, whereas the non-magnetic ferrous stick 14 is held between the thumb and forefinger, at the top rod portion 20, of the operator while two non-magnetic ferrous balls 16 and 17 hang beneath the stick 14, at the bottom rod portion 21, with the magnet removed from the proximity of the aforementioned elements, thereby allowing two balls, 16 and 17, to be suspended from stick 14 out of the magnetic influence of the field produced by the magnet 10.

This effect can be performed with one ball 16 or two balls 16 and 17 at the discretion of the operator and as a consequence of the amount of skill the operator has acquired in perfecting the operating procedure.

The effect depicted in FIG. 6 is accomplished by placing a single ball 16 on the magnet 10 (FIG. 2) and lowering the stick 14, while top rod portion 20 is held between the thumb and forefinger, onto the ball 16. In FIG. 3 the operator lifts the stick 14 which, in turn, lifts the ball 16, in contact with rod bottom portion 21, away from the magnet 10. The operator then, as indicated in FIG. 4, adds one more ball 17 in contact with the first hanging ball 16, underneath the first ball 16, which is in contact with bottom rod portion 21. In FIG. 5 the operator slowly removes the magnet 10 from the proximity of the other elements by sliding it laterally away from the elements.

The final sequence in FIG. 6 is accomplished by removing the magnet 10 which is slowly slid away from the hanging elements, leaving one ball 16 or two balls 16 and 17 suspended from the bottom rod portion 21, of the stick 14, while held for a short period of time with the top rod portion 20 held between the thumb and forefinger of the operator.

Figure 7:
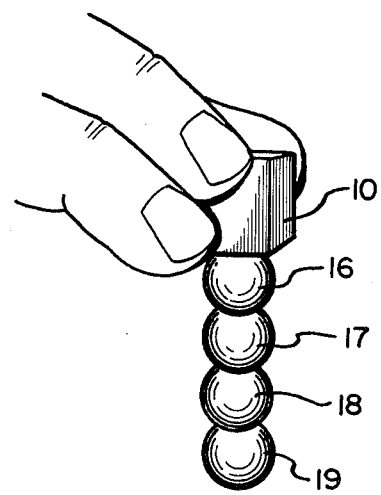
FIGS. 7, 8, 9 and 10, which are perspective views illustrating a second manipulating procedure according to the method of the present invention.
Figure 8:
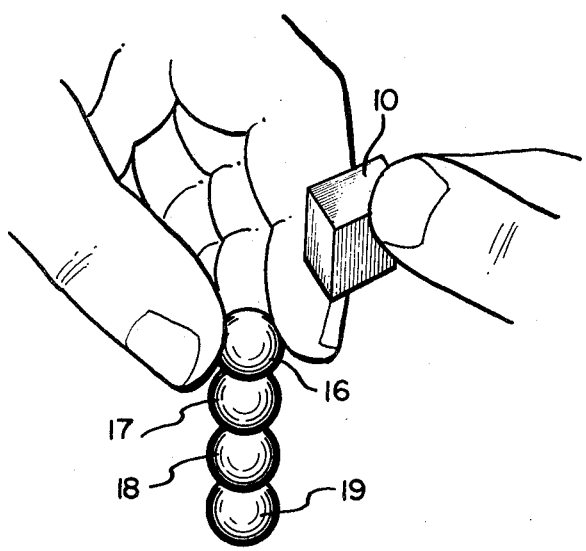
Figure 9:
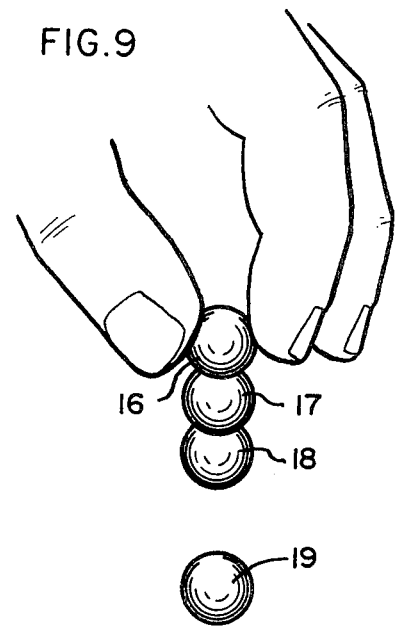
Figure 10:
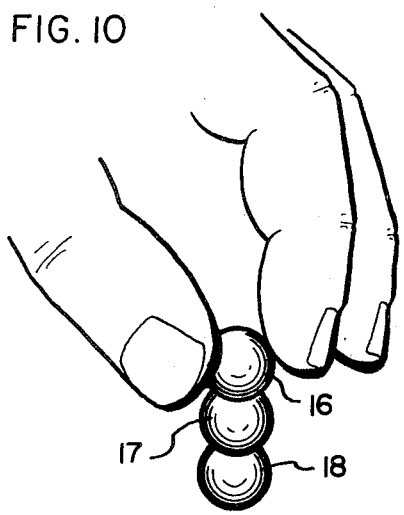

The method to accomplish another unique "effect" is shown in FIGS. 7, 8, 9 and 10 whereas in FIG. 7 the magnet 10 is held between the thumb and forefinger of the operator while underneath is placed four balls 16, 17, 18, and 19, and where in FIG. 8 the top ball 16 is held between the thumb and forefinger of one hand while the magnet 10 is slowly removed from physical contact of the top ball 16 by the operator's other hand. As the magnet 10 is removed it will be noticed that the bottom ball 19 will fall almost immediately, (FIG. 9) leaving three balls 16, 17 and 18 hanging from between the thumb and forefinger of the operator, (FIG. 10) whereupon the magnet 10 is removed completely from the proximity of the balls 16 and out of the field produced by said magnet 10.

This effect will not remain for a long period of time, but when used as a toy or game, it will provide a challenging operating procedure which will enable the operator to attain a certain level of accomplishment or skill.

Figure 11:
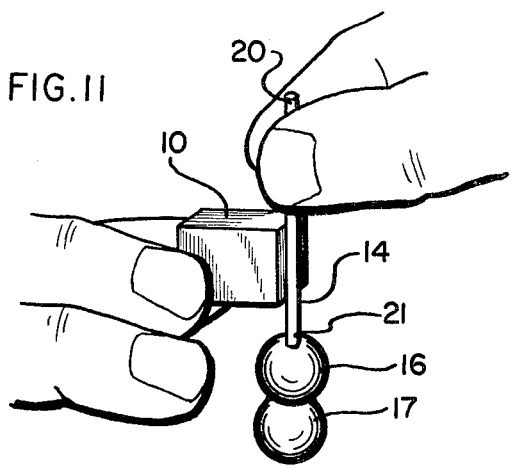
FIGS. 11, 12, 13, 14, 15, 16 and 17 are perspective views of a third manipulating procedure according to the method of the present invention.
Figure 12:
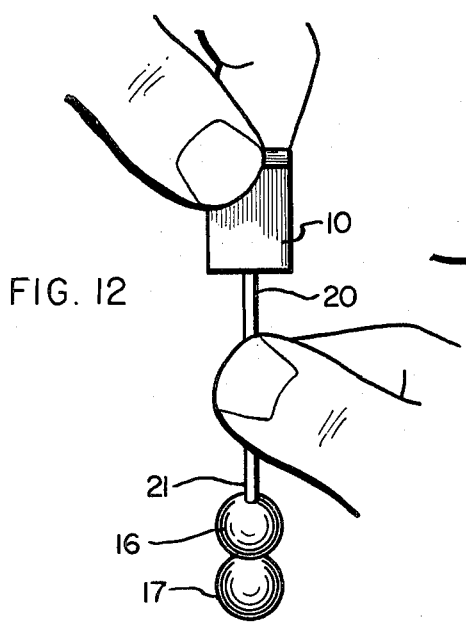

The operating procedure to achieve another specific effect using the elements of the toy can be seen in the sequence of FIGS. 11 through 17, whereas the method used to obtain the configuration shown in FIG. 17 of one ball 18 above the stick 14 in contact with the top portion 20 and with two balls 16 and 17 below the stick 14, in contact with the bottom rod portion 21 while being held between the thumb and forefinger of the operator is accomplished by referring to FIG. 11. In FIG. 11 the operator begins by holding the magnet 10 between the thumb and forefinger of one hand and placing the North or South Pole of the magnet 10 in perpendicular contact with the bottom rod portion 21 of the stick 14. Two balls 16 and 17 are then picked up from the bottom rod portion 21 of the stick 14 and the stick 14 is then held between the thumb and forefinger of the operator's other hand while the magnet 10 is slowly slid up the stick 14 (FIG. 12) to the top rod portion 20 of the stick 14.

Figure 13:
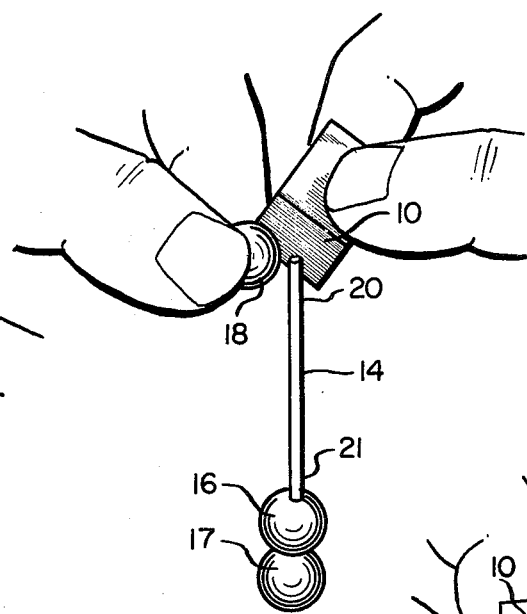
Figure 14:
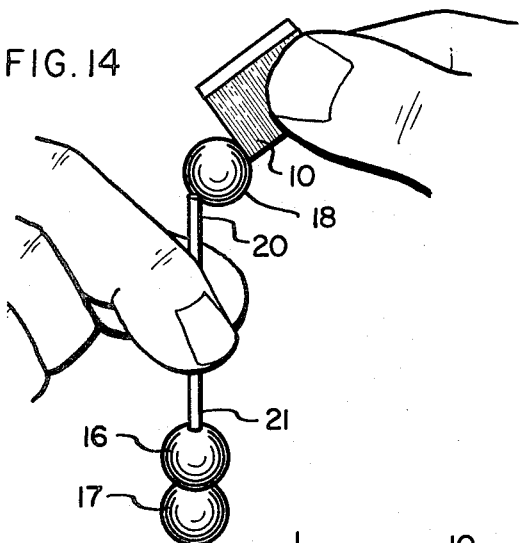
Figure 15:
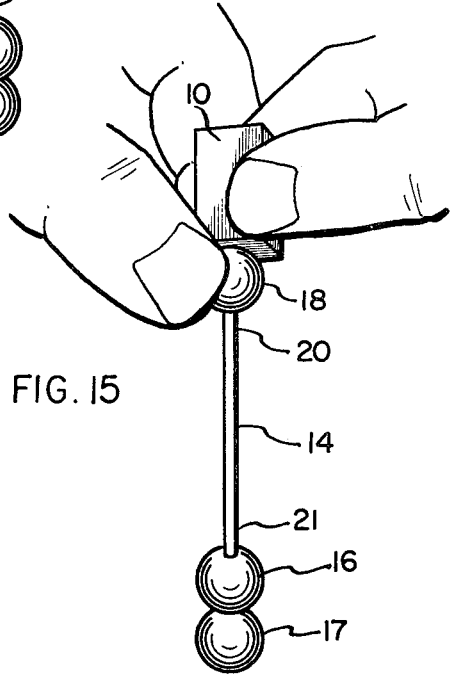
Figure 16:
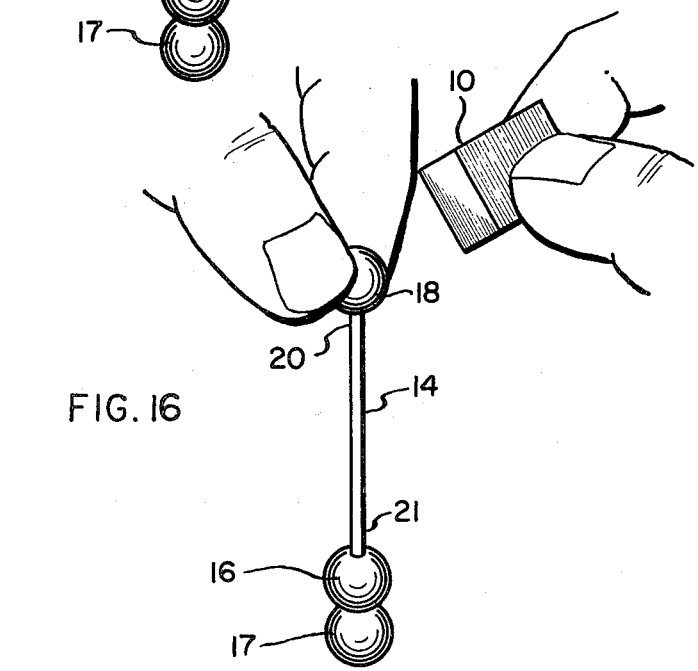

In FIG. 13 the magnet 10 is held now between the thumb and forefinger of one hand while another ball 18 is placed between the stick 14 and the magnet 10, and while at the same time the stick 14 is pulled down to accomodate the area needed to fit the new ball 18 below magnet 10 (FIG. 14) and above top rod portion 20. In FIG. 15 the magnet 10 is held by the thumb and forefinger of one hand while the other hand holds the top ball 18 between the operator's thumb and forefinger while the ball 18 is in contact with top rod portion 20, and proceeds to slowly remove the magnet 10 from the proximity of the other elements (FIG. 16) by raising magnet 10 vertically or sliding magnet 10 laterally. FIG. 17 shows the final step in the sequence which allows the aforementioned elements to be hung from the operator's thumb and forefinger.

This effect may also be accomplished with either one ball 18 or two balls 18 and 19 above the stick 14 but no more than a total of three balls are capable of being hung in this configuration as described, when using elements of the specifications enumerated earlier. Lesser or greater effects are possible by using varying materials.

Figure 17:
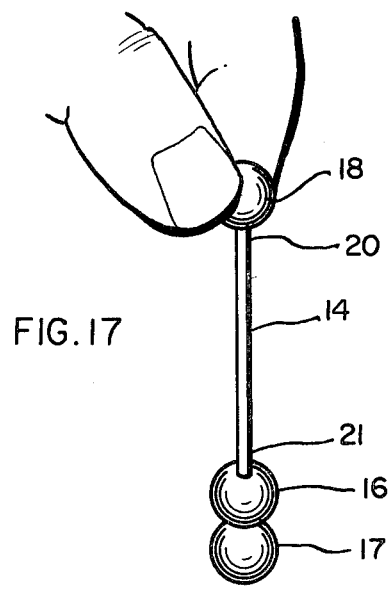

It is to be noted that the configuration depicted in FIG. 17 can be held indefinitely when the lowest ball 17 is removed from the other hanging elements. This toy may be manufactured in any convenient shape or size and any magnet may be used with any combination of sticks or balls. The aforementioned specifications of the component elements of the device are stated for reference purposes only and do not constitute the sole manufacturing configuration.

The toy described herein is generally a device which may be used as an entertaining toy, puzzle or game enabling the operator to produce a number of effects, by using a combination of a magnet, non-magnetic ferrous stick and non-magnetic ferrous balls which can be hung from the thumb and forefinger of the operator in a number of unspecified combinations but generally adhering to the methods stated herein. From the foregoing, the construction and operation of the device will be readily understood and further explanation is believed unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed is:

1. The method of operating a magnetic toy, said toy comprising (i) a permanent magnet having magnetic north and south poles defining a magnetic axis therebetween, (ii) a non-magnetic ferrous rod, having a rod top end portion and a rod bottom end portion, and (iii) a plurality of non-magnetic ferrous balls, whereby said method results in said balls being suspended from said rod bottom end portion when said rod is removed from the influence of the magnetic field produced directly by said magnet, said method comprising the steps of:

touching a first ferrous ball with a magnetic pole of said magnet;
arranging said rod bottom end portion so that its axis is substantially coaxial with said magnetic axis and in contact with said first ferrous ball;
moving said ferrous rod and first ball from contact with said magnetic pole, but within the magnetic field of said magnetic pole, whereby said first ball is suspended from said rod above said magnet;
contacting said first ball with a second ferrous ball whereby said first and second balls are suspended from said rod bottom end portion above said magnet; and
removing said rod and suspended ferrous balls from the proximity of said magnet and out of the influence of the field produced directly by said magnet.

2. The method of operating a magnetic toy, said toy comprising a permanent magnet having magnetic north and south poles defining a magnetic axis therebetween and a plurality of non-magnetic ferrous balls, whereby said balls are suspended in depending relationship when said balls are removed from the influence of the magnetic field produced directly by said magnet, said method comprising the steps of:

touching a first ferrous ball with a magnetic pole of said magnet;
contacting said first ball with a second ferrous ball whereby said first and second balls are suspended from said magnet;
contacting said second ball with a thrid ferrous ball and said third ball with a fourth ferrous ball whereby said first, second, third and fourth balls are suspended from said magnet;
removing said suspended balls from the proximity of said magnet, and out of the influence of the field produced directly by said magnet, whereupon the said fourth suspended ball will immediately fall thereby leaving said first, second, and third balls suspended in depending relationship.

3. The method of operating a magnetic toy, said toy comprising, (i) a permanent magnet having magnetic north and south poles defining a magnetic axis therebetween, (ii) a plurality of non-magnetic ferrous balls, and (iii) a vertically extending non-magnetic ferrous rod having a rod top end portion and a rod bottom end portion, said method comprising the steps of:

touching said ferrous rod with said magnet adjacent said rod bottom end portion so that the axis of said rod is substantially perpendicular to said magnetic axis;
contacting a first ferrous ball with said rod bottom end portion whereby said first ball is suspended from said rod;
contacting said first ball with a second ferrous ball whereby the first and second balls are suspended below said rod;
moving said magnet vertically upwards while in contact with said rod to said rod top end portion;
contacting a third ferrous ball to said magnet whereby said third ball resides immediately adjacent, but not touching said rod top end portion;
contacting said rod with said third ball concurrent with lowering said rod from said magnet whereby said third ball is placed between said magnet and rod and in contact with said rod top portion;
removing said rod and ferrous balls from the proximity of said magnet and out of the influence of the field produced directly by said magnet whereby said rod remains suspended from said third ball and said first and second balls depend from this rod.

* * * * *